US012331782B2

(12) United States Patent
Laubichler et al.

(10) Patent No.: US 12,331,782 B2
(45) Date of Patent: Jun. 17, 2025

(54) PLAIN BEARING PAD AND PLAIN BEARING ARRANGEMENT, AND NACELLE EQUIPPED WITH A PLAIN BEARING ARRANGEMENT FOR A WIND TURBINE

(71) Applicant: Miba Gleitlager Austria GmbH, Laakirchen (AT)

(72) Inventors: Patrick Laubichler, Gmunden (AT); Johannes Hoelzl, Berg im Attergau (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 98 days.

(21) Appl. No.: 18/039,003

(22) PCT Filed: Nov. 29, 2021

(86) PCT No.: PCT/AT2021/060452
§ 371 (c)(1),
(2) Date: May 26, 2023

(87) PCT Pub. No.: WO2022/109649
PCT Pub. Date: Jun. 2, 2022

(65) Prior Publication Data
US 2024/0003339 A1  Jan. 4, 2024

(30) Foreign Application Priority Data

Nov. 30, 2020 (AT) ............... A 51044/2020
Apr. 8, 2021 (AT) ............... A 50259/2021
May 28, 2021 (AT) ............... A 50432/2021

(51) Int. Cl.
*F16C 23/04* (2006.01)
*F03D 80/70* (2016.01)
(Continued)

(52) U.S. Cl.
CPC .......... *F16C 23/045* (2013.01); *F03D 80/709* (2023.08); *F16C 33/1065* (2013.01);
(Continued)

(58) Field of Classification Search
CPC .... F16C 17/105; F16C 23/041; F16C 23/043; F16C 23/045; F16C 33/1065; F16C 33/108; F16C 33/26
See application file for complete search history.

(56) References Cited

U.S. PATENT DOCUMENTS 2,488,775 A  11/1949 Heim
2,744,799 A  5/1956 Howarth
(Continued)

FOREIGN PATENT DOCUMENTS

AU  2016201226 A1  3/2017
DE  650 737 C  9/1937
(Continued)

OTHER PUBLICATIONS

International Search Report in PCT/AT2021/060452, mailed Jan. 28, 2022.

*Primary Examiner* — James Pilkington
(74) *Attorney, Agent, or Firm* — Collard & Roe, P.C.

(57) ABSTRACT

A slide bearing pad for a slide bearing arrangement has a bearing surface. On a first circumferential face of the slide bearing pad, a lubricating oil transport groove is configured in the region of the bearing surface. The lubricating oil transport groove may have a radial groove depth and a circumferential groove depth between 10% and 300% of the radial groove depth.

17 Claims, 7 Drawing Sheets

(51) Int. Cl.
*F16C 33/10* (2006.01)
*F16C 33/26* (2006.01)

(52) U.S. Cl.
CPC ............ *F16C 33/108* (2013.01); *F16C 33/26* (2013.01); *F16C 2360/31* (2013.01)

(56) References Cited

U.S. PATENT DOCUMENTS

| | | | |
|---|---|---|---|
| 3,512,854 | A | 5/1970 | Harbage, Jr. |
| 5,702,186 | A | 12/1997 | Hackstie et al. |
| 9,458,880 | B2 | 10/2016 | Kari et al. |
| 11,486,446 | B2 | 11/2022 | Hoelzl et al. |
| 12,012,941 | B2* | 6/2024 | Holzinger ............... F16C 43/02 |
| 12,098,709 | B2* | 9/2024 | Loitesberger ........... F16C 35/02 |
| 2014/0377063 | A1 | 12/2014 | Guerenbourg et al. |
| 2015/0252839 | A1 | 9/2015 | Turmeau et al. |
| 2022/0145862 | A1 | 5/2022 | Holzinger et al. |
| 2022/0260113 | A1 | 8/2022 | Takara et al. |

FOREIGN PATENT DOCUMENTS

| | | |
|---|---|---|
| DE | 2 027 856 A1 | 1/1972 |
| DE | 10 2013 211 710 B3 | 10/2014 |
| EP | 2 762 735 A1 | 8/2014 |
| EP | 3 252 306 A1 | 12/2017 |
| GB | 432 370 A | 7/1935 |
| GB | 486 220 A | 6/1938 |
| GB | 1 224 496 A | 3/1971 |
| JP | 2000-274432 A | 10/2000 |
| JP | 6765581 B1 | 10/2020 |
| WO | 2011/127510 A1 | 10/2011 |
| WO | 2016/076682 A2 | 5/2016 |
| WO | 2020/176918 A1 | 9/2020 |
| WO | 2020/176919 A1 | 9/2020 |

* cited by examiner

PLAIN BEARING PAD AND PLAIN BEARING ARRANGEMENT, AND NACELLE EQUIPPED WITH A PLAIN BEARING ARRANGEMENT FOR A WIND TURBINE

CROSS REFERENCE TO RELATED APPLICATIONS

This application is the National Stage of PCT/AT2021/060452 filed on Nov. 29, 2021, which claims priority under 35 U.S.C. § 119 of Austrian Application No. A51044/2020 filed on Nov. 30, 2020, Austrian Application No. A50259/2021 filed on Apr. 8, 2021, and Austrian Application No. A50432/2021 filed on May 28, 2021, the disclosures of which are incorporated by reference. The international application under PCT article 21(2) was not published in English.

BACKGROUND OF THE INVENTION

1. Field of the Invention

The invention relates to a slide bearing pad and a slide bearing arrangement, and a nacelle equipped with the slide bearing arrangement for a wind turbine.

2. Description of the Related Art

A bearing element for mounting the rotor hub of a wind turbine is known from WO 2011/127510 A1.

SUMMARY OF THE INVENTION

It was the object of the present invention to make available an improved slide bearing arrangement.

This object is achieved by means of a device in accordance with the claims.

In accordance with the invention, a slide bearing pad for a slide bearing arrangement is configured, wherein the slide bearing pad has a bearing surface. On a first circumferential face of the slide bearing pad, a lubricating oil transport groove is configured in the region of the bearing surface. Such a lubricating oil transport groove has the advantage that the lubricating oil can be conveyed upwards from a lubricating oil reservoir by means of the lubricating oil transport groove and can therefore be distributed across a mating surface of the ring element. This ensures that an improved lubricating effect can be achieved in the slide bearing in order to increase the lifetime of the slide bearing. Furthermore, these measures render a lubricating oil pump obsolete.

Further, it may be expedient if the lubricating oil transport groove has a radial groove depth and a circumferential groove depth, wherein the circumferential groove depth is between 10% and 300%, in particular between 20% and 100%, preferably between 60% and 80%, of the radial groove depth. Particularly a lubricating oil transport groove thus sized is surprisingly well-suited for transporting the lubricating oil.

Furthermore, it is conceivable that the radial groove depth is between 1 mm and 30 mm, in particular between 3 mm and 18 mm, preferably between 6 mm and 13 mm.

It may further be provided that the circumferential groove depth is between 1 mm and 30 mm, in particular between 2 mm and 18 mm, preferably between 4 mm and 8 mm.

Figure 7:
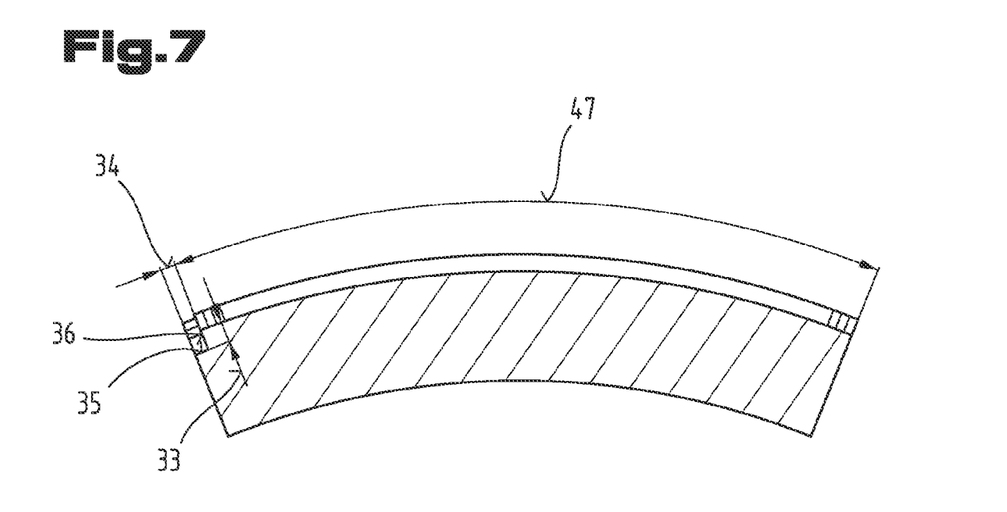
FIG. 7 a sectional representation of the slide bearing pad in accordance with the intersecting line VII-VII from FIG. 6.

It may further be provided that a radial groove base is configured as a straight line, viewed in a groove cross-section. Such a sectional view is represented in FIG. 7. In particular, it can be provided that such a groove base is configured as a cylinder segment or as a cone segment. This has the advantage that a lubricating oil transport groove thus configured is simple to produce. In particular, a groove thus configured can be produced by means of a milling cutter.

Furthermore, it can be provided that a circumferential groove base is configured as a straight line, viewed in a groove cross-section. This has the advantage that a lubricating oil transport groove thus configured is simple to produce. In particular, a groove thus configured can be produced by means of a milling cutter.

Also advantageous is an embodiment in accordance with which it can be provided that the lubricating oil transport groove extends in an axial direction of the slide bearing pad. This measure enables the volume throughput of the lubricating oil transport groove to be improved.

Further, it can be provided that the slide bearing pad serves to be arranged between an inner ring element and an outer ring element, wherein the slide bearing pad is configured to be firmly coupled with the inner ring element in the operating mode and to rotate with same relative to the outer ring element, wherein the bearing surface, in a spherical cap section, has the basic form of a spherical cap with a spherical cap radius, wherein the bearing surface of the slide bearing pad is configured to be in contact with a mating surface of the outer ring element, wherein the lubricating oil transport groove extends in an axial direction of the slide bearing pad, wherein the lubricating oil transport groove has a first groove end, which is arranged at a first distance from a first front end of the slide bearing pad, and has a second groove end, which is arranged at a second distance from a second front end of the slide bearing pad, wherein a first depression with respect to the bearing surface is configured between the first groove end and the first front end of the slide bearing pad and wherein a second depression with respect to the bearing surface is configured between the second groove end and the second front end of the slide bearing pad.

In accordance with one advancement, it is possible that the lubricating oil transport groove has a first groove end, which is arranged at a first distance from a first front end of the slide bearing pad, and has a second groove end, which is arranged at a second distance from a second front end of the slide bearing pad. This has the advantage that this measure ensures that the lubricating oil transport groove can be closed at its axial ends and therefore the transport throughput of the lubricating oil transport groove can be improved.

It may further be expedient if a first depression with respect to the bearing surface is configured between the first groove end and the first front end of the slide bearing pad and a second depression with respect to the bearing surface is configured between the second groove end and the second front end of the slide bearing pad. This has the advantage that lubricating oil from the lubricating oil sump can flow into the groove through the depressions in an axial direction in order to achieve a sufficient lubricating oil supply.

Further, it is conceivable that a depth of the first depression is between 2% and 50%, in particular between 5% and 30%, preferably between 8% and 15%, of the radial groove depth.

Further, it is conceivable that a depth of the second depression is between 2% and 50%, in particular between 5% and 30%, preferably between 8% and 15%, of the radial groove depth. A surprisingly good lubrication of the slide bearing surfaces can be achieved particularly in a lubricating oil transport groove thus configured.

Furthermore, it can be provided that the lubricating oil transport groove has a first transition radius to the radial groove base on the first groove end and that the lubricating oil transport groove has a second transition radius to the radial groove base on the second groove end. This has the advantage that the lubricating oil can be retained well in a lubricating oil transport groove thus configured. Furthermore, a lubricating oil transport groove thus configured is simple to produce.

It may further be provided that the transition radius is between 1 mm and 20 mm, in particular between 3 mm and 15 mm, preferably between 5 mm and 7 m.

In an alternative embodiment variant, it can be provided that the lubricating oil transport groove has a first transition radius to the circumferential groove base on the first groove end and that the lubricating oil transport groove has a second transition radius to the circumferential groove base on the second groove end. This has the advantage that the lubricating oil can be retained well in a lubricating oil transport groove thus configured. Furthermore, a lubricating oil transport groove thus configured is simple to produce.

Further, it can be provided that the radial groove base of the lubricating oil transport groove has individual sub-regions, wherein the individual sub-regions each have a plane surface.

Further, it can be provided that the bearing surfaces of the individual slide bearing pads, in a spherical cap section, have the basic form of a spherical cap with a spherical cap radius. Particularly in slide bearing pads thus configured with sliding surfaces thus configured, the lubricating oil transport groove in accordance with the invention results in surprisingly improved sliding properties.

In accordance with one particular embodiment, it is possible that the circumferential groove depth is between 0.5% and 20%, in particular between 1.5% and 10%, preferably between 3% and 7%, of a bearing surface arc length of the bearing surface. This has the advantage that a lubricating oil transport groove thus configured is well-suited for transporting lubricating oil.

Further, it can be provided that a lubricating oil feeder is configured between the lubricating oil transport groove and the bearing surface. This has the advantage that the lubricating oil can be fed from the lubricating oil transport groove into the region of the bearing surface in an improved manner. In particular, it can be provided that the lubricating oil feeder is configured so as to taper off, starting from the lubricating oil transport groove.

In a first embodiment variant, it can be provided that the lubricating oil feeder is configured so as to be graduated. In particular, different graduation levels can be provided, wherein the graduation level closest to the lubricating oil transport groove has the greatest depth and wherein the graduation level closest to the bearing surface has the smallest depth.

In another embodiment variant, it can be provided that the lubricating oil feeder is configured in the form of a rounding, viewed in the cross-section. In particular, it can be provided that the rounding has the greatest depth in the region of the lubricating oil transport groove and transitions tangentially to the bearing surface.

In another embodiment variant, it can be provided that the lubricating oil feeder is configured in the form of a wedge surface, viewed in the cross-section.

In accordance with the invention, a slide bearing arrangement is configured. The slide bearing arrangement comprises:
- an inner ring element;
- an outer ring element;
- at least one slide bearing element, which is arranged between the inner ring element and the outer ring element, wherein the slide bearing element comprises at least two slide bearing pads, wherein a bearing surface of the slide bearing pad and a mating surface of the outer ring element, or a mating surface of the inner ring element, are in contact with each other. The slide bearing pad is configured according to any one of the above embodiments.

A slide bearing arrangement thus configured has a surprisingly long lifetime and a surprisingly good operability.

In a first embodiment variant, it can be provided that the slide bearing pads are coupled with the inner ring element and that the counter rotation surface is configured on the outer ring element.

In an alternative exemplary embodiment, it can be provided that the slide bearing pads are coupled with the outer ring element and that the counter rotation surface is configured on the inner ring element.

In particular, it can be advantageous if a circumferential lubricating oil distribution groove is configured on a circumference of the outer ring element, wherein a lubricating oil bore is configured, which flow-connects the lubricating oil distribution groove with the mating surface, wherein the lubricating oil bore opens into an oil pocket in the region of the mating surface. This measure enables the lubricating oil supply of the slide bearing to be improved further.

In accordance with the invention, a nacelle for a wind turbine is configured. The nacelle comprises:
- a nacelle housing;
- a rotor shaft;
- a rotor hub, which is arranged on the rotor shaft;
- a rotor bearing arrangement for mounting the rotor shaft on the nacelle housing. The rotor bearing arrangement comprises multiple slide bearing pads, which are configured according to any one of the above embodiments.

Further, it can be expedient if the individual slide bearing pads have the basic form of a spherical cap with a spherical cap radius in a spherical cap section and have a transition radius in a transition section.

In particular, it can be advantageous if a bearing block is configured, in which the outer ring element is received, wherein a cover is configured at least at an axial front end of the bearing block, wherein a lubricating oil reservoir is configured so as to be integrated in the cover or adjoined to the cover. This has the advantage that, in a lubricating oil reservoir thus configured, a sufficient quantity of lubricating oil for a hydrodynamic slide bearing can be stocked up.

In accordance with one particular embodiment, it is possible that the rotor bearing arrangement comprises a bearing block, in which the outer ring element is received, wherein the bearing block has an axial stop for the outer ring element, wherein the axial stop is configured at an axial front end of the bearing block facing away from the rotor hub. This has the advantage that the axial stop acts in a main load direction of the rotor bearing arrangement.

Also advantageous is an embodiment, in accordance with which it can be provided that that the slide bearing arrangement is configured as a hydrodynamic slide bearing arrangement. Particularly a hydrodynamic slide bearing arrangement has a low frictional resistance and therefore a high efficiency.

Further, it can be provided that a permanent magnet is arranged in the lubricating oil reservoir. This has the advantage that particles with ferromagnetic properties can adhere to the permanent magnet. Therefore, the permanent magnet can serve to collect contaminants Such contaminants can occur due to abraded particles on the sliding surfaces, for example, or due to other types of wear. Further, it is conceivable that the permanent magnet is arranged in the lubricating oil reservoir so as to be exchangeable and/or releasable in order to enable a cleaning of the permanent magnet.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF THE PREFERRED EMBODIMENTS

First of all, it is to be noted that, in the different embodiments described, equal parts are provided with equal reference numbers and/or equal component designations, where the disclosures filled into in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, these specifications of location are to be analogously transferred to the new position.

Figure 1:
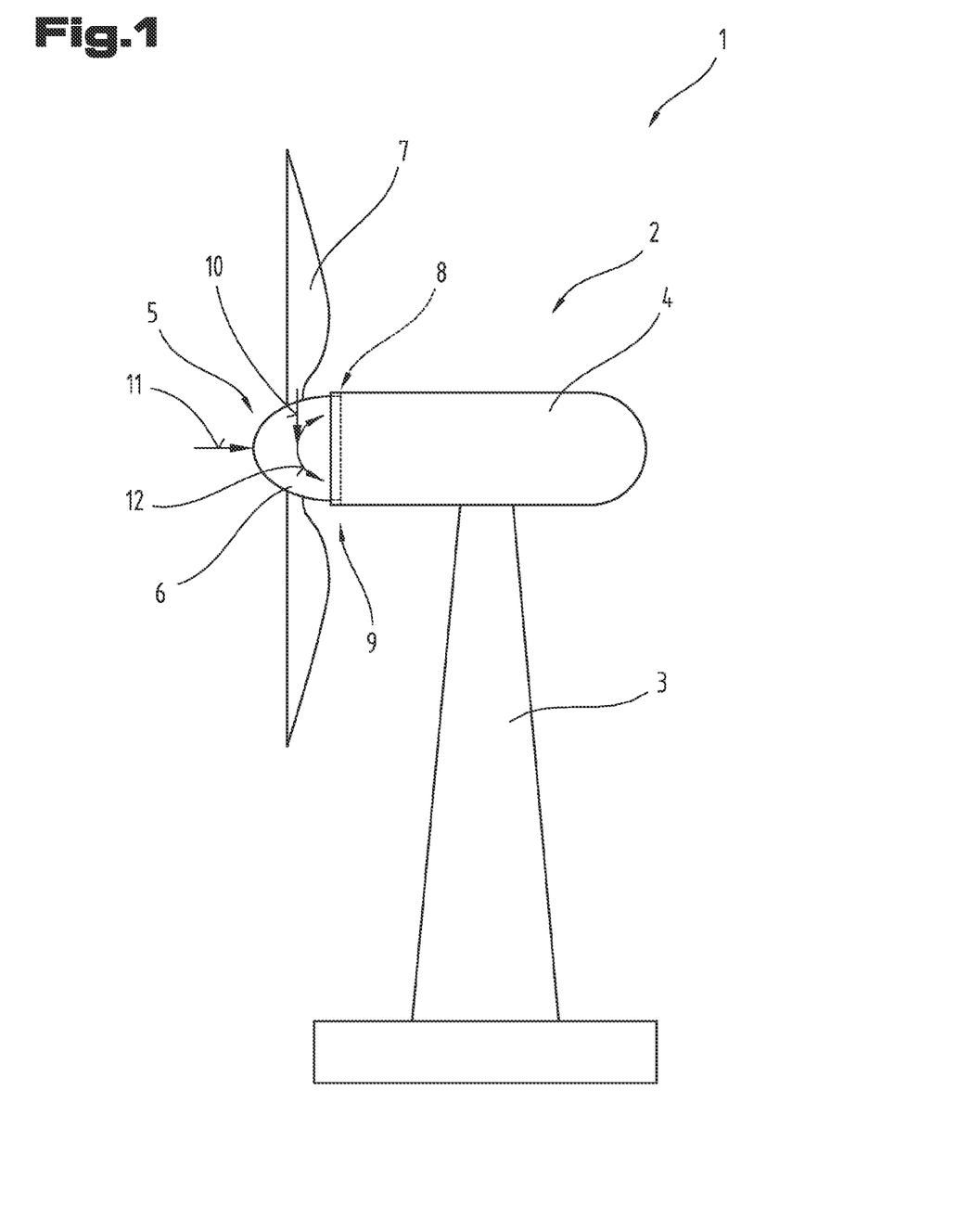
FIG. 1 a schematic representation of a wind turbine.

FIG. 1 shows, in a schematic representation, a first exemplary embodiment of a wind turbine 1 for generating electric energy from wind energy. The wind turbine 1 comprises a nacelle 2, which is received on a tower 3 so as to be rotatable. The nacelle 2 comprises a nacelle housing 4, which forms the main structure of the nacelle 2. Arranged in the nacelle housing 4 of the nacelle 2 are the electrotechnical components such as a generator of the wind turbine 1, for example.

Further, a rotor 5 is configured, which has a rotor hub 6 with rotor blades 7 arranged thereupon. The rotor hub 6 is considered part of the nacelle 2. The rotor hub 6 is received on the nacelle housing 4 by means of a rotor bearing arrangement 8 so as to be rotatably movable. In particular, it is provided that a slide bearing arrangement 9 in accordance with the invention, which slide bearing arrangement 9 will be described in more detail below, is used as rotor bearing arrangement 8. In particular, it can be provided that the rotor hub 6 is arranged on a rotor shaft 16, wherein the rotor shaft 16 is mounted in the rotor bearing arrangement 8.

The rotor bearing arrangement 8, which serves to mount the rotor hub 6 on the nacelle housing 4 of the nacelle 2, is configured for receiving a radial force 10 and an axial force 11. The axial force 11 is a result of the force of the wind. The radial force 10 is a result of the weight of the rotor 5 and acts on the center of gravity of the rotor 5. As the center of gravity of the rotor 5 lies outside of the rotor bearing arrangement 8, a tilting moment 12 is caused in the rotor bearing arrangement 8 by the radial force 10. The tilting moment 12 can equally be caused by an uneven load on the rotor blades 7. This tilting moment 12 can be absorbed by means of a second bearing arrangement, which is arranged at a distance to the rotor bearing arrangement 8. The second bearing arrangement can be configured in the region of the generator, for example.

Figure 2:
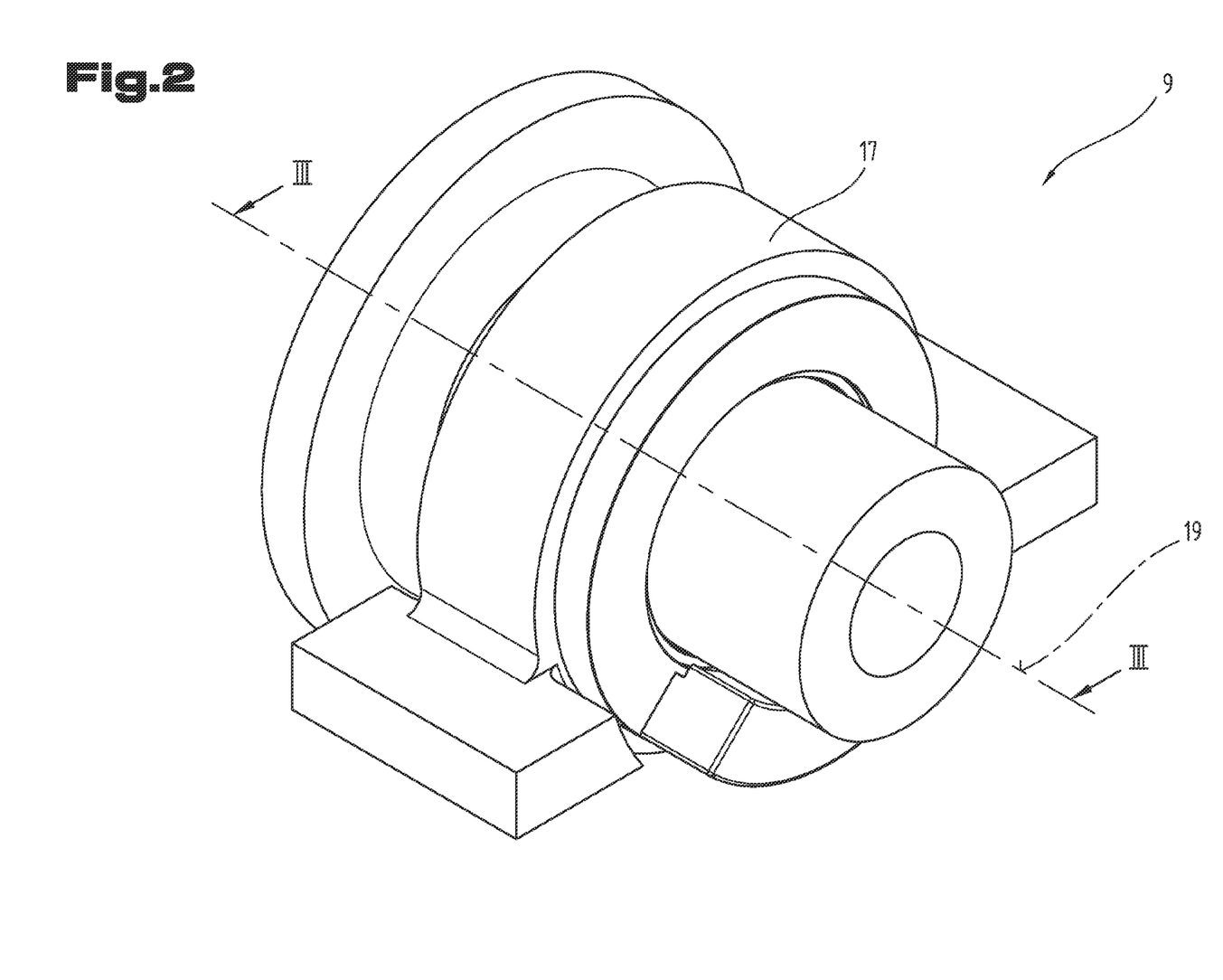
FIG. 2 a perspective representation of a first exemplary embodiment of a slide bearing arrangement.

FIG. 2 shows a first exemplary embodiment of the slide bearing arrangement 9 integrated in the nacelle 2. Of course, the slide bearing arrangement 9 represented in FIG. 2 can also be used in any and all other industrial applications outside of wind turbines. The slide bearing arrangement 9 is represented in FIG. 2 in a perspective view.

Figure 3:
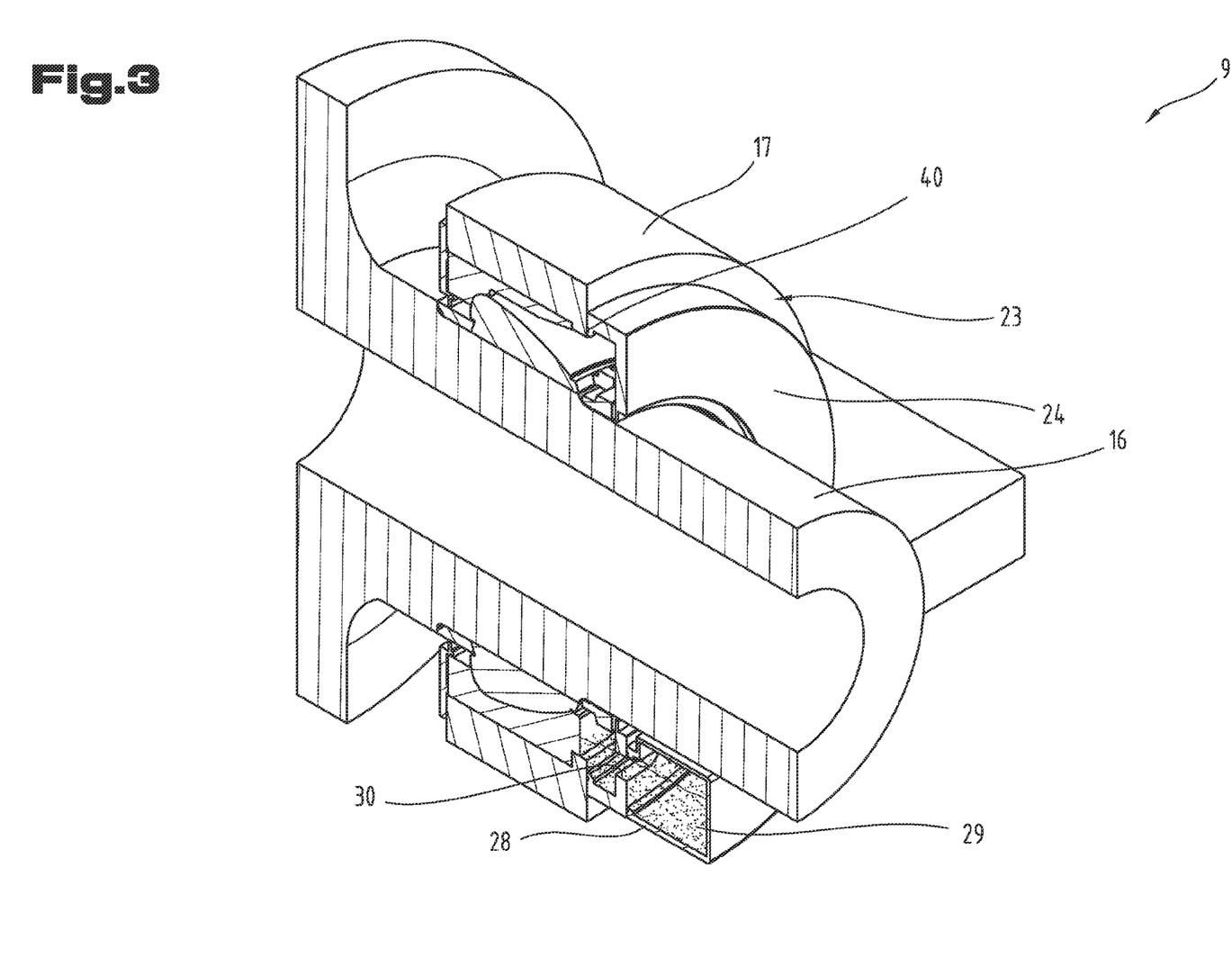
FIG. 3 a perspective view of a longitudinal section of the first exemplary embodiment of the slide bearing arrangement.

FIG. 3 shows the first exemplary embodiment of the slide bearing arrangement 9 in a perspective sectional representation.

Subsequently, the slide bearing arrangement 9 is described by means of a combination of FIGS. 2 and 3.

As can be seen from FIGS. 2 and 3, it can be provided that the slide bearing arrangement 9 has an inner ring element 13 and an outer ring element 14. Arranged between the inner ring element 13 and the outer ring element 14 is a slide bearing element 15, which serves to mount the inner ring element 13 relative to the outer ring element 14 in a rotational slide bearing arrangement.

In the exemplary embodiment which is represented in FIGS. 2 and 3, the inner ring element 13 is configured as rotor shaft 16. Of course, the inner ring element 13 can also be any other type of shaft. Further, it is also conceivable that the inner ring element 13 is configured as an independent component, which is received on a shaft, in particular on a rotor shaft 16.

As can be seen particularly readily from FIG. 3, it can be provided that the outer ring element 14 is received in a bearing block 17. In particular, it can be provided that the bearing block 17 is coupled with the nacelle housing 4, or is alternatively also directly shaped in the nacelle housing 4. In this exemplary embodiment, it can therefore be provided that the outer ring element 14 is rigidly coupled with the nacelle housing 4 and the inner ring element 13 is rotatable, by means of the slide bearing element 15, relative to the outer ring element 14 with respect to an axis of rotation 19.

Further, it can be provided that the bearing block 17 serves directly as outer ring element 14.

Therefore, the rotor shaft 16 is received in the nacelle housing 4, by means of the slide bearing arrangement 9, so as to be rotatable.

As can further be seen from FIGS. 2 and 3, it can be provided that the slide bearing element comprises multiple individual slide bearing pads 18, which are arranged across the circumference so as to be distributed between the inner ring element 13 and the outer ring element 14.

Due to the structure shown in FIG. 3, the individual slide bearing pads 18 are firmly coupled with the inner ring element 13 in the operating mode of the slide bearing arrangement 9 and therefore rotate with same relative to the outer ring element 14. To enable the rotational movement between the inner ring element 13 and the outer ring element 14, a bearing surface is configured on each of the individual slide bearing pads 18, which rests against a mating surface 21 of the outer ring element 14 in the ready mode of the slide bearing arrangement 9. The mating surface 21 is arranged on an inner face 22 of the outer ring element 14.

The bearing surface 20 of the slide bearing pad 18 and the mating surface 21 of the outer ring element 14 are configured as sliding surfaces, which slide against each other during operation of the slide bearing arrangement 9. In particular, it can be provided that the mating surface 21 of the outer ring element 14 is configured as a hard, wear-resistant surface, which can be formed by a hardened steel, for example. The bearing surface 20 of the slide bearing pad 18 can be formed from a slide bearing raw material that is soft in comparison to the mating surface 21. Of course, it is also conceivable that the bearing surface 20 has a slide coating.

As can be seen particularly readily from FIG. 3, it can be provided that the individual slide bearing pads 18 each have a bearing surface 20 that is cambered, viewed in an axial direction.

As can further be seen from FIG. 3, it can be provided that a cover 24 is arranged on an axial front end 23 of the bearing block 17. The cover 24 serves to close up the interior of the bearing block 17.

As can further be seen from FIG. 3, it can be provided that a lubricating oil reservoir 25 is adjoined to the cover 24, which lubricating oil reservoir 25 serves to receive lubricating oil 26.

In particular, it can be provided here that a pass-through opening 27 is configured in the cover 24, through which the lubricating oil 26 from the lubricating oil reservoir 25 can flow into the interior of the bearing block 17.

Of course, it is also conceivable that the lubricating oil reservoir 25 is arranged at a different site in the bearing block 17.

Figure 4:
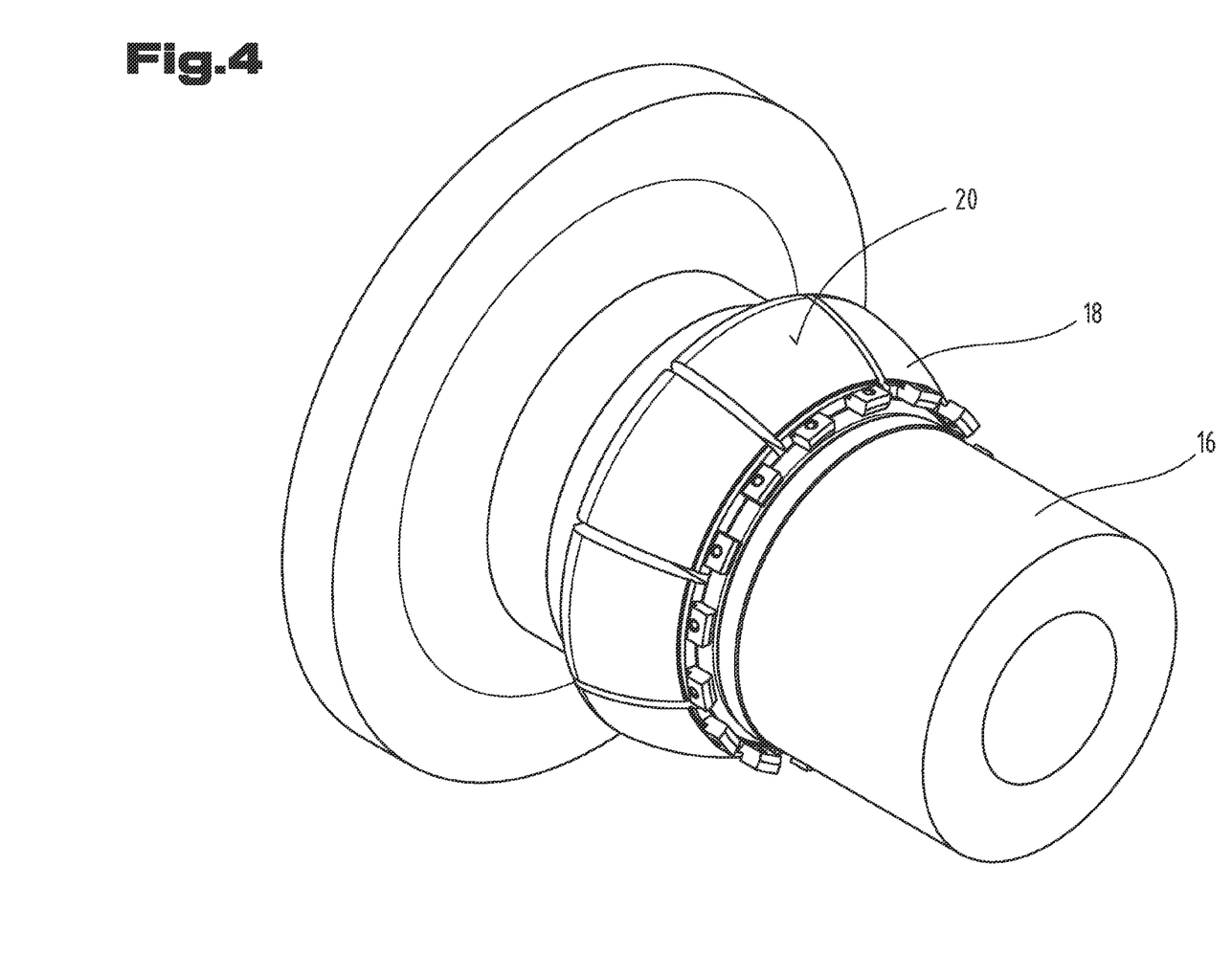
FIG. 4 a perspective view of the first exemplary embodiment of a rotor shaft with slide bearing pads arranged thereupon.

FIG. 4 shows the rotor shaft 16 with the slide bearing pads 18 arranged thereupon in a perspective view, wherein the same reference numbers and/or the same component designations as in the preceding FIGS. 1 to 3 are used again. To avoid unnecessary repetitions, the detailed description in the preceding FIGS. 1 to 3 should be noted and/or is referred to.

As can be seen from FIG. 4, the individual slide bearing pads 18 can be received on the inner ring element 14 so as to be distributed across the circumference and spaced apart from one another in a circumferential direction.

Figure 5:
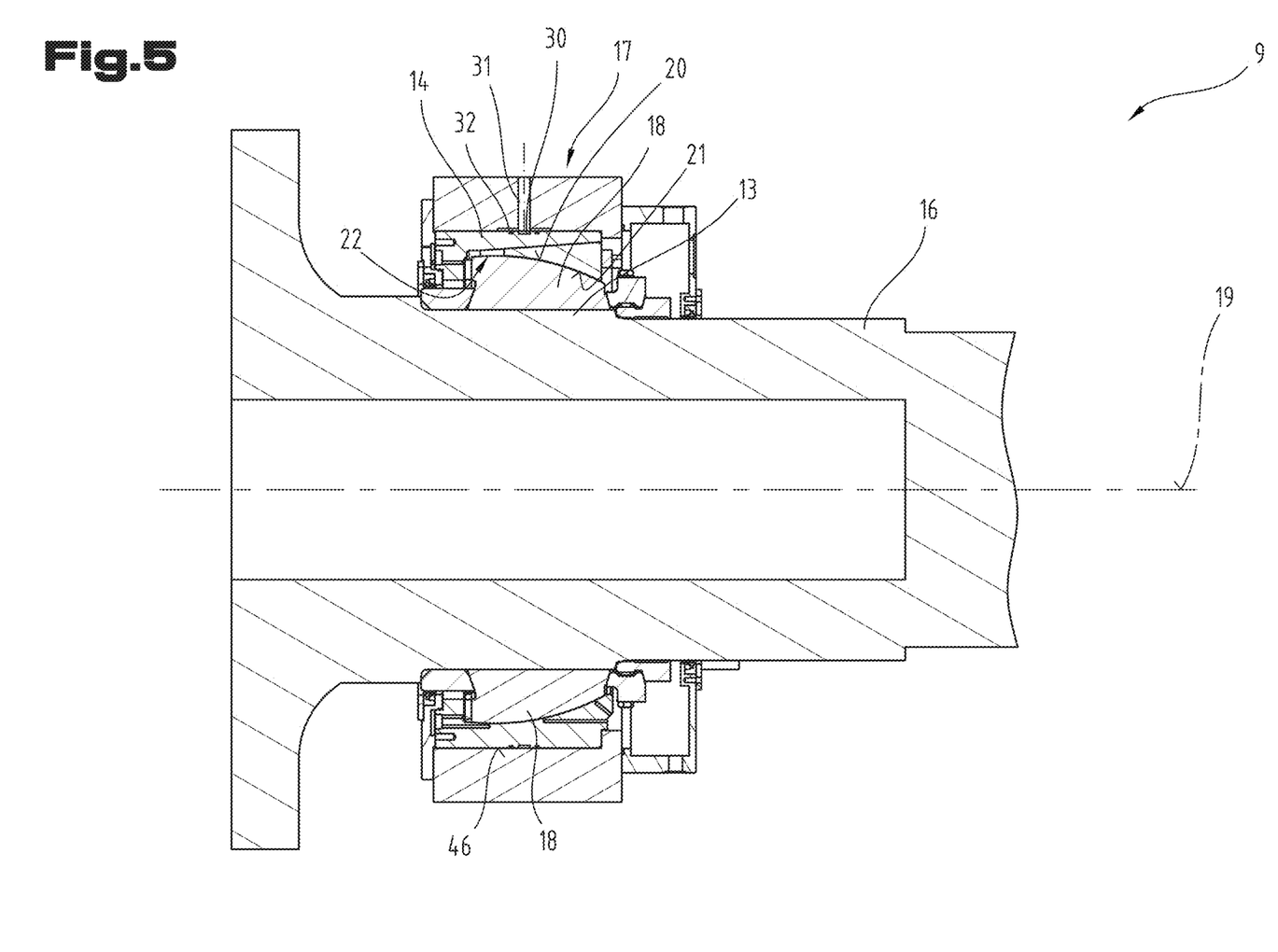
FIG. 5 a longitudinal section of another exemplary embodiment of the slide bearing arrangement.

As can be seen from FIG. 5, it can be provided that a circumferential lubricating oil distribution groove 30 is configured on a circumference of the outer ring element 14. The lubricating oil distribution groove 30 can be configured on the surface on which the outer ring element 14 rests against the bearing block 17. The lubricating oil distribution groove 30 can therefore be bounded by the outer ring element 14 and the bearing block 17 and therefore form a fluid canal for transporting a lubricating oil.

Further, it can be provided that the a lubricating oil bore 31 opens into an oil pocket 32. The oil pocket 32 can extend in an axial direction of the outer ring element 14.

Further, it can be provided that a seal is arranged on both sides of the lubricating oil distribution groove 30, which seal serves to seal the lubricating oil distribution groove 30 between the outer ring element 14 and the bearing block 17.

Figure 6:
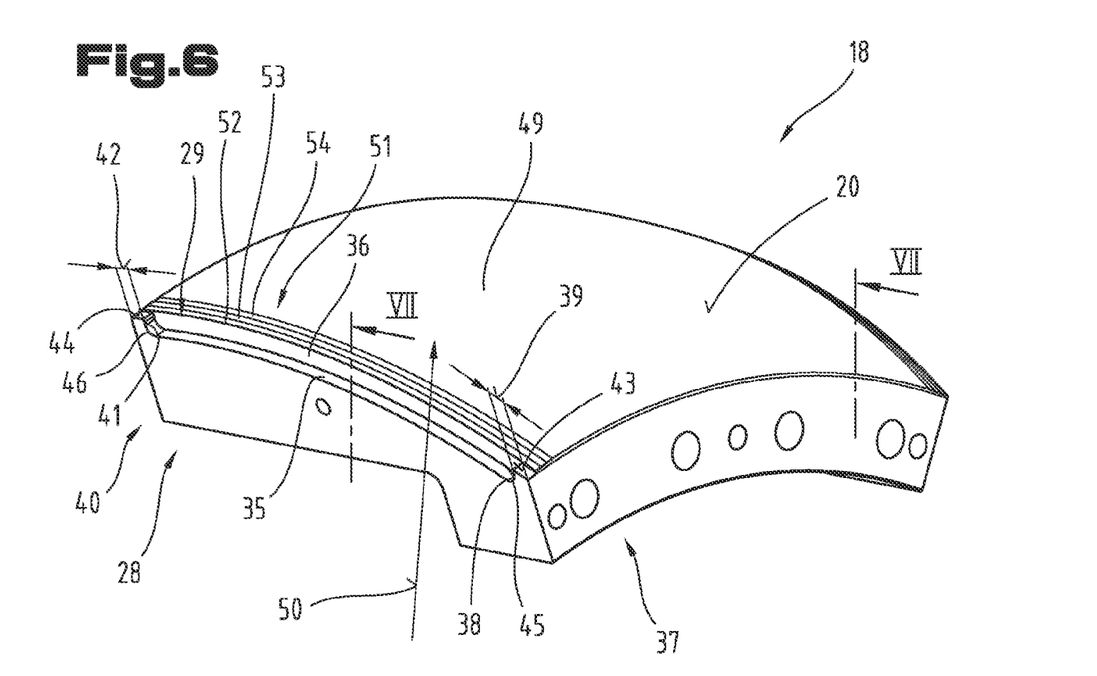
FIG. 6 another exemplary embodiment of a slide bearing pad in a perspective representation.

FIG. 6 shows the slide bearing pad 18 in a first perspective representation. FIG. 7 shows the slide bearing pad 18 from FIG. 6 in a sectional representation.

As can be seen from FIG. 6, it can be provided that a lubricating oil transport groove 29 is configured on a first circumferential face 28 of the slide bearing pad 18. The lubricating oil transport groove 29 can be configured in the region of the bearing surface 20. In particular, it can be provided that the lubricating oil transport groove 29 interrupts the bearing surface 20.

As can be seen from FIG. 7, it can be provided that the lubricating oil transport groove 29 has a radial groove depth 33. Further, the lubricating oil transport groove 29 can have a circumferential groove depth 34. In particular, it can be provided here that the lubricating oil transport groove 29 has a radial groove base 35 and a circumferential groove base 36.

As can be seen particularly readily from FIG. 6, it can be provided that a first groove end 38 is configured on a first front end 37 of the slide bearing pad 18, which first groove end 38 is arranged at a first distance 39 from the first front end 37.

As can further be seen from FIG. 6, it can be provided that a second groove end 41 is configured in the region of a second front end 40 of the slide bearing pad. The second groove end 41 can be arranged at a second distance 42 from the second front end 40.

As can further be seen from FIG. 6, it can be provided that a first depression 43 is configured in the region of the first groove end 38. The first depression 43 can in particular be configured in the form of a depression in relation to the bearing surface 22. As can further be seen from FIG. 6, it can be provided that a second depression 44 is configured in the region of the second groove end 41. The second depression 44 can form a depression in relation to the bearing surface 20.

As can further be seen from FIG. 6, it can be provided that a first transition radius 45 is configured between the radial groove base 35 of the lubricating oil transport groove 29 and the first groove end 38.

Further, it can be provided that a second transition radius 46 is configured between the radial groove base 35 and the second groove end 41.

As can further be seen from FIG. 6, it can be provided that a lubricating oil feeder 51 is configured between the lubricating oil transport groove 29 and the bearing surface 20. As can be seen from FIG. 6, the lubricating oil feeder 51 can be configured graduated and comprise a first graduation level 52, a second graduation level 53 and a third graduation level 54. Of course, also more, or fewer, individual graduation levels can be configured.

As can be seen from FIG. 7, it can be provided that the bearing surface 20 has a bearing surface arc length 47. The bearing surface arc length 47 is measured in a circumferential direction of the bearing surface 20. In particular, the bearing surface arc length 47 is measured at the smallest diameter of the bearing surface 20.

As can be readily seen from FIG. 6, it can be provided that the bearing surface 20 is configured in the shape of a spherical cap. In particular, it can be provided that a spherical cap section 49 is configured, which has a spherical cap radius 50.

Figure 8:
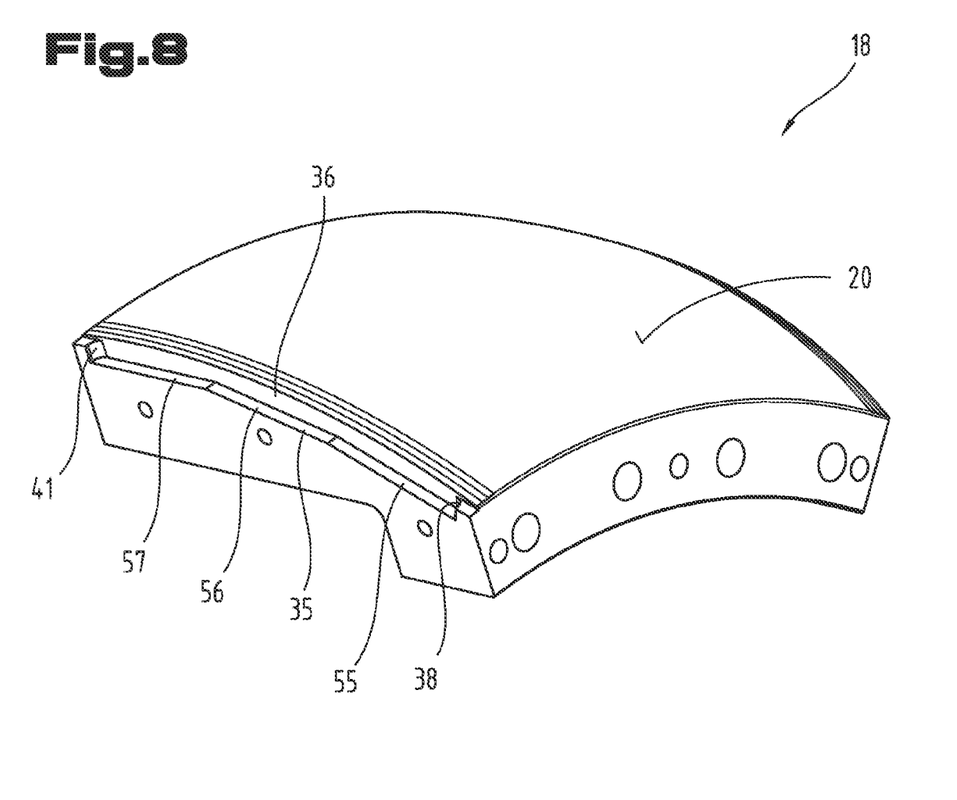
FIG. 8 another exemplary embodiment of a slide bearing pad in a perspective representation.

FIG. 8 shows another embodiment of the slide bearing pad 18 that is optionally independent in itself, wherein the same reference numbers and/or the same component designations as in the preceding FIGS. 1 to 7 are used again. To avoid unnecessary repetitions, the detailed description in the preceding FIGS. 1 to 7 should be noted and/or is referred to.

As can be seen from FIG. 8, it can be provided that the radial groove base 35 has a first subregion 55, a second sub-region 56 and a third sub-region 57 across its extension. Of course, also more, or fewer, individual sub-regions can be configured.

The exemplary embodiments show possible embodiment variants, wherein it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

Any and all specifications of value ranges in the description at issue are to be understood to comprise any and all sub-ranges of same, for example the specification 1 to 10 is to be understood to mean that any and all sub-ranges starting from the lower limit 1 and from the upper limit 10 are comprised therein, i.e. any and all sub-ranges start at a lower limit of 1 or larger and end at an upper limit of 10 or less, e.g. 1 to 1.7, or 3.2 to 8.1, or 5.5 to 10.

Finally, as a matter of form, it should be noted that for ease of understanding of the structure, elements are partially not depicted to scale and/or are enlarged and/or are reduced in size.

| Table of reference numbers | |
| --- | --- |
| List of reference numbers | |
| 1 | wind turbine |
| 2 | nacelle |
| 3 | tower |
| 4 | nacelle housing |
| 5 | rotor |
| 6 | rotor hub |
| 7 | rotor blade |
| 8 | rotor bearing arrangement |
| 9 | slide bearing arrangement |
| 10 | radial force |
| 11 | axial force |
| 12 | tilting moment |
| 13 | inner ring element |
| 14 | outer ring element |
| 15 | slide bearing element |
| 16 | rotor shaft |
| 17 | bearing block |
| 18 | slide bearing pad |
| 19 | axis of rotation |
| 20 | bearing surface |
| 21 | mating surface |
| 22 | inner face |
| 23 | axial front end of bearing block |
| 24 | cover |
| 25 | lubricating oil reservoir |
| 26 | lubricating oil |
| 27 | pass-through opening |
| 28 | circumferential face |
| 29 | lubricating oil transport groove |
| 30 | lubricating oil distribution groove |
| 31 | lubricating oil bore |
| 32 | oil pocket |
| 33 | radial groove depth |
| 34 | circumferential groove depth |
| 35 | radial groove base |
| 36 | circumferential groove base |
| 37 | first front end |
| 38 | first groove end |
| 39 | first distance |
| 40 | second front end |
| 41 | second groove end |
| 42 | second distance |
| 43 | first depression |
| 44 | second depression |
| 45 | first transition radius |
| 46 | second transition radius |
| 47 | bearing surface arc length |
| 48 | circumference of outer ring element |
| 49 | spherical cap section |
| 50 | spherical cap radius |
| 51 | lubricating oil feeder |
| 52 | first graduation level |
| 53 | second graduation level |
| 54 | third graduation level |
| 55 | first sub-region of radial groove base |
| 56 | second sub-region of radial groove base |
| 57 | third sub-region of radial groove base |

The invention claimed is:

1. A slide bearing pad for a slide bearing arrangement, the slide bearing pad comprising:
a bearing surface,
a first circumferential face,
a lubricating oil transport groove configured on the first circumferential face in the region of the bearing surface,
wherein the lubricating oil transport groove has a first groove end, which is arranged at a first distance from a first front end of the slide bearing pad, and has a second groove end, which is arranged at a second distance from a second front end of the slide bearing pad,
wherein a first depression with respect to the bearing surface is configured between the first groove end and the first front end of the slide bearing pad, and
wherein a second depression with respect to the bearing surface is configured between the second groove end and the second front end of the slide bearing pad.

2. The slide bearing pad according to claim 1, wherein the lubricating oil transport groove has a radial groove depth and a circumferential groove depth, wherein the circumferential groove depth is between 10% and 300% of the radial groove depth.

3. The slide bearing pad according to claim 2, wherein the circumferential groove depth is between 20% and 100% of the radial groove depth.

4. The slide bearing pad according to claim 2, wherein the circumferential groove depth is between 60% and 80% of the radial groove depth.

5. The slide bearing pad according to claim 2, wherein the circumferential groove depth is between 1.5% and 10% of a bearing surface arc length of the bearing surface.

6. The slide bearing pad according to claim 2, wherein the circumferential groove depth is between 3% and 7% of a bearing surface arc length of the bearing surface.

7. The slide bearing pad according to claim 1, wherein a radial groove base is configured as a straight line, viewed in a groove cross-section.

8. The slide bearing pad according to claim 7, wherein the lubricating oil transport groove has a first transition radius between the radial groove base and the first groove end and wherein the lubricating oil transport groove has a second transition radius between the radial groove base and the second groove end.

9. The slide bearing pad according to claim 1, wherein a circumferential groove base is configured as a straight line, viewed in a groove cross-section.

10. The slide bearing pad according to claim 1, wherein the slide bearing pad is configured to be arranged between an inner ring element and an outer ring element, wherein the slide bearing pad is configured to be coupled with the inner ring element in an operating mode and to rotate with the inner ring element relative to the outer ring element, wherein the bearing surface comprises a spherical cap section, wherein the bearing surface of the slide bearing pad is configured to be in contact with a mating surface of the outer ring element, and wherein the lubricating oil transport groove extends in an axial direction of the slide bearing pad.

11. The slide bearing pad according to claim 1, wherein the bearing surface of the slide bearing pad comprises a spherical cap section.

12. The slide bearing pad according to claim 2, wherein the circumferential groove depth is between 0.5% and 20% of a bearing surface arc length of the bearing surface.

13. The slide bearing pad according to claim 1, wherein a lubricating oil feeder is configured between the lubricating oil transport groove and the bearing surface.

14. A slide bearing arrangement (9), comprising:
an inner ring element;
an outer ring element; and
at least one slide bearing element, which is arranged between the inner ring element and the outer ring element, wherein the slide bearing element comprises at least two slide bearing pads,
wherein a bearing surface of each of the at least two slide bearing pads and a mating surface of the outer ring element or a mating surface of the inner ring element are in contact with each other,
wherein each of the at least two slide bearing pads is are configured according to claim 1.

15. A nacelle for a wind turbine, the nacelle comprising:
a nacelle housing;
a rotor shaft;
a rotor hub, which is arranged on the rotor shaft; and
a rotor bearing arrangement for mounting the rotor shaft on the nacelle housing,
wherein the rotor bearing arrangement comprises multiple slide bearing pads according to claim 1.

16. A slide bearing pad for a slide bearing arrangement, the slide bearing pad comprising:
a bearing surface,
a first circumferential face,
a lubricating oil transport groove configured on the first circumferential face in the region of the bearing surface,
wherein the lubricating oil transport groove has a first groove end, which is arranged at a first distance from a first front end of the slide bearing pad, and has a second groove end, which is arranged at a second distance from a second front end of the slide bearing pad,
wherein the lubricating oil transport groove has a first transition radius between a radial groove base and the first groove end, and
wherein the lubricating oil transport groove has a second transition radius between the radial groove base and the second groove end.

17. A slide bearing pad for a slide bearing arrangement, the slide bearing pad comprising:
a bearing surface,
a first circumferential face,
a lubricating oil transport groove configured on the first circumferential face in the region of the bearing surface, and
wherein the bearing surface of the slide bearing pad comprises a spherical cap section.

* * * * *

UNITED STATES PATENT AND TRADEMARK OFFICE
CERTIFICATE OF CORRECTION

PATENT NO. : 12,331,782 B2
APPLICATION NO. : 18/039003
DATED : June 17, 2025
INVENTOR(S) : Patrick Laubichler et al.

It is certified that error appears in the above-identified patent and that said Letters Patent is hereby corrected as shown below:

In the Claims

In Claim 14, (Column 11, Line 38): after "pads" delete "is"

Signed and Sealed this
Fifteenth Day of July, 2025

Coke Morgan Stewart
*Acting Director of the United States Patent and Trademark Office*